United States Patent
Lu

(10) Patent No.: US 11,475,923 B2
(45) Date of Patent: Oct. 18, 2022

(54) TRAY DEVICE WITH ROTATABLE HANDLE

(71) Applicant: Fulian Precision Electronics (Tianjin) Co., LTD., Tianjin (CN)

(72) Inventor: Wen-Hu Lu, Tianjin (CN)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 143 days.

(21) Appl. No.: 16/937,996

(22) Filed: Jul. 24, 2020

(65) Prior Publication Data
US 2021/0398567 A1 Dec. 23, 2021

(30) Foreign Application Priority Data
Jun. 19, 2020 (CN) .......................... 202010567085.7

(51) Int. Cl.
*G06F 1/18* (2006.01)
*G11B 33/12* (2006.01)
*G11B 33/14* (2006.01)

(52) U.S. Cl.
CPC ............ *G11B 33/124* (2013.01); *G06F 1/187* (2013.01); *G11B 33/1493* (2013.01)

(58) Field of Classification Search
CPC ..... G06F 1/187; G11B 33/124; G11B 33/128; G11B 33/1493
See application file for complete search history.

(56) References Cited

U.S. PATENT DOCUMENTS

| | | | | |
|---|---|---|---|---|
| 6,876,547 B2* | 4/2005 | McAlister | ............... | G06F 1/184 361/679.33 |
| 7,139,166 B2* | 11/2006 | Marcade | ................. | G06F 1/187 |
| 7,502,224 B2* | 3/2009 | Motoe | ..................... | G06F 1/184 361/679.33 |
| 7,656,657 B2* | 2/2010 | Grady | ................... | G11B 33/124 |
| 8,405,968 B2 | 3/2013 | Chen | | |
| 9,928,882 B1* | 3/2018 | Yang | ..................... | G11B 33/124 |

FOREIGN PATENT DOCUMENTS

| | | |
|---|---|---|
| CN | 201628911 U | 11/2010 |
| TW | 201510992 A | 3/2015 |

* cited by examiner

*Primary Examiner* — James Wu
(74) *Attorney, Agent, or Firm* — ScienBiziP, P.C.

(57) ABSTRACT

A tray device includes a tray body and a bracket mounted on the tray body. The tray body includes at least one connecting plate, a resilient sheet, and a handle assembly. The resilient sheet is coupled to the at least one connecting plate. The handle assembly includes a handle, a rotating shaft, and a snap hook. One end of the handle is hinge-mounted to the at least one connecting plate through the rotating shaft. The snap hook is located on the handle. The handle is fixed to the at least one connecting plate through the snap hook.

16 Claims, 3 Drawing Sheets

TRAY DEVICE WITH ROTATABLE HANDLE

FIELD

The subject matter herein generally relates to hard disk assembly, and more particularly to a tray device for mounting hard disks in an electronic device.

BACKGROUND

Due to the diversification of storage protocols and the development of hard disk interface technology, hard disks of different sizes and different types are often used in electronic devices. However, many hard disk device bays are designed for specific types of hard disks, which are not universal for different types of hard disks and are complicated to install.

BRIEF DESCRIPTION OF THE DRAWINGS

Implementations of the present disclosure will now be described, by way of embodiments, with reference to the attached figures.

DETAILED DESCRIPTION

Figure 1:
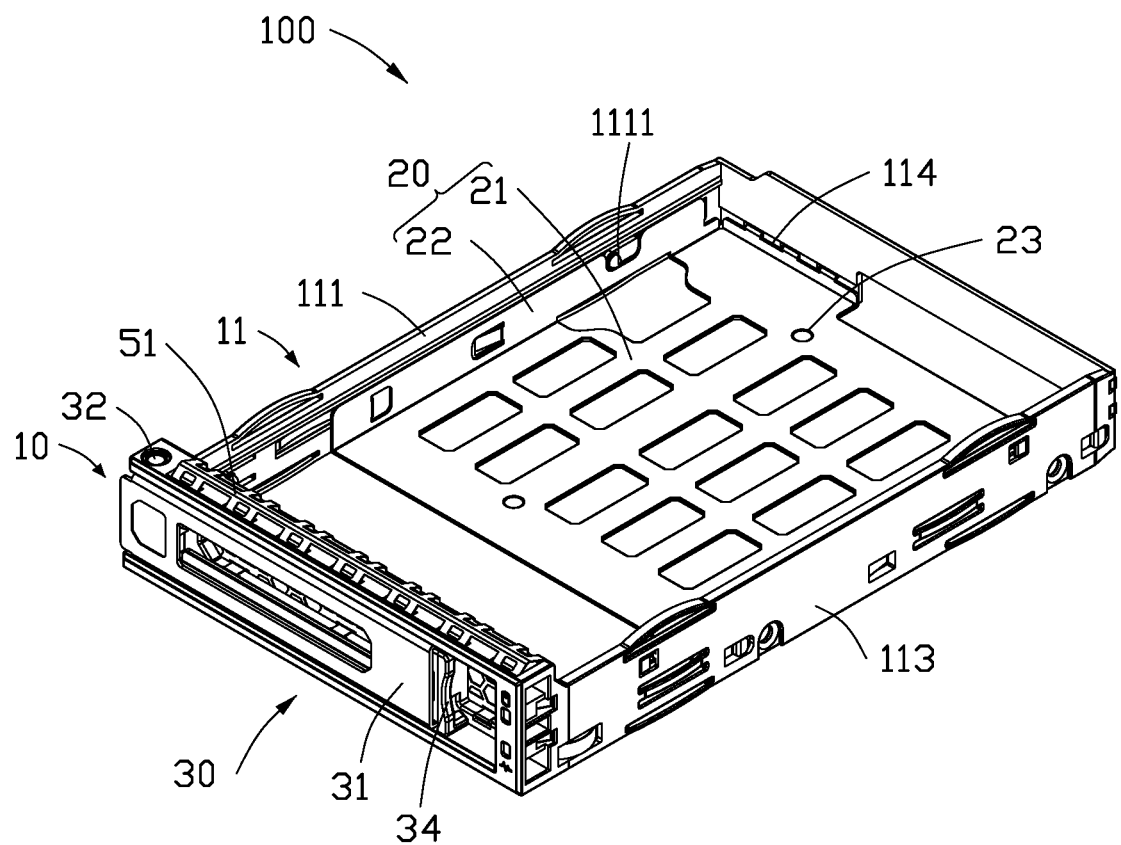
FIG. 1 is a schematic diagram of a tray device according to an embodiment.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

Figure 2:
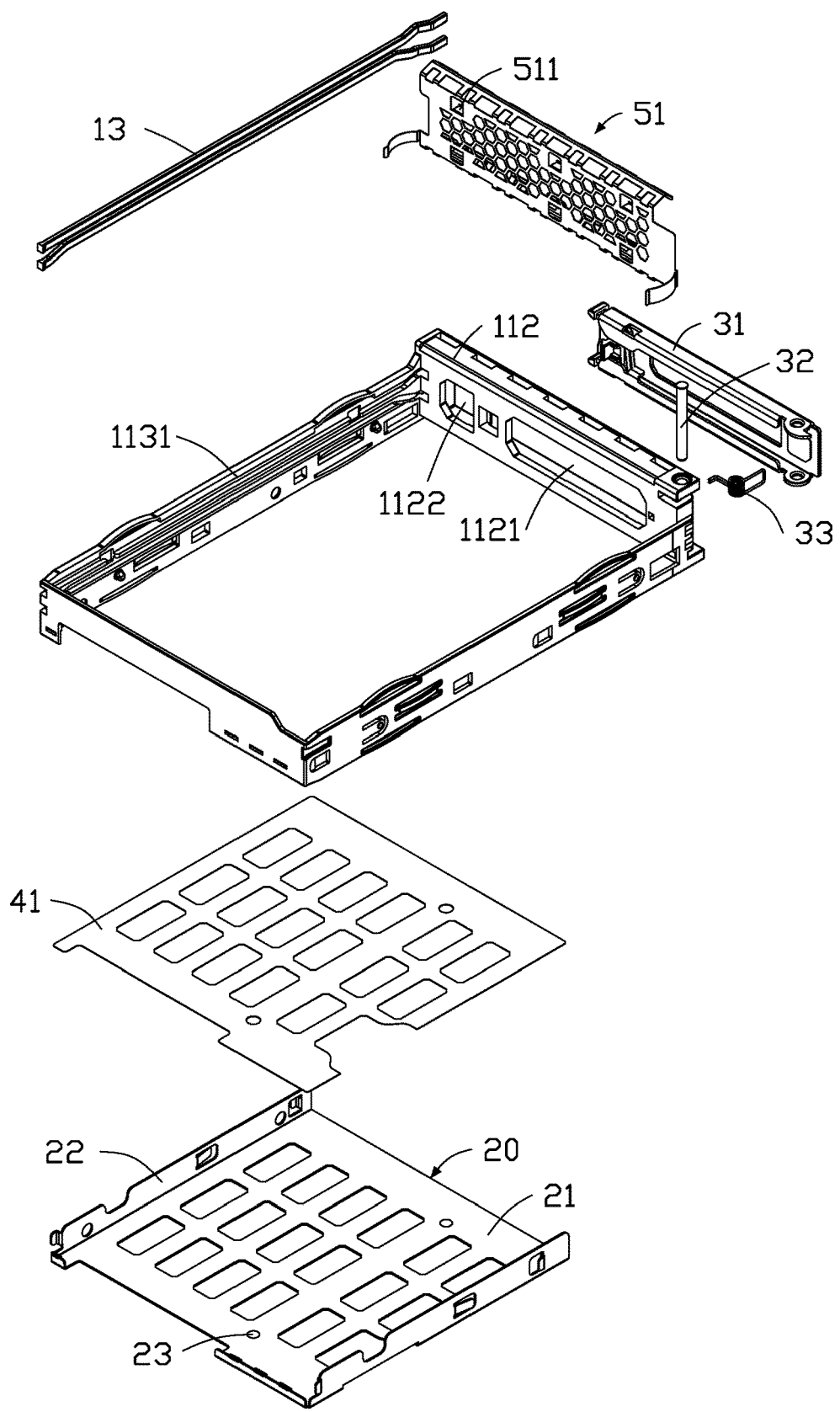
FIG. 2 is an exploded schematic view of the tray device.
Figure 3:
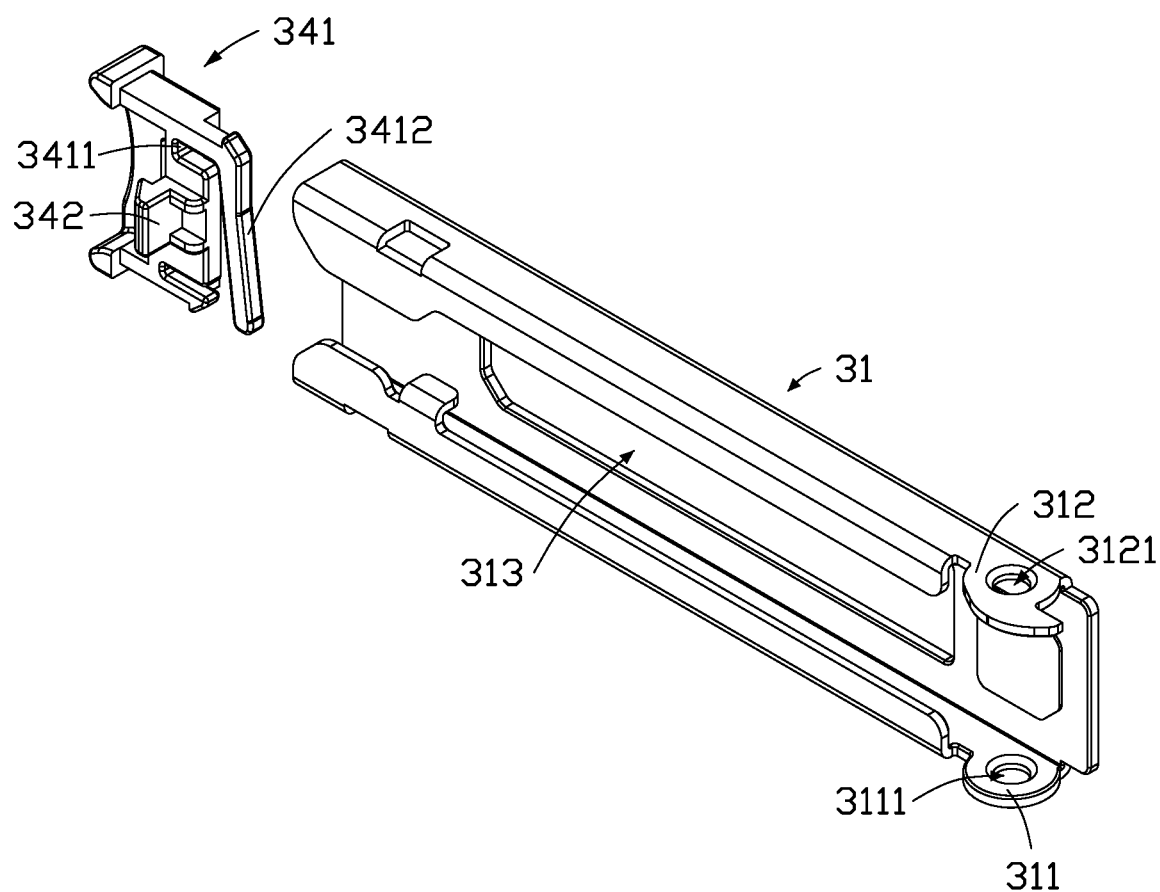
FIG. 3 is a schematic diagram of a handle assembly of the tray device.

Referring to FIG. 1, FIG. 2, and FIG. 3, a tray device 100 for carrying various types of hardware includes a tray body 10, a bracket 20, and a handle assembly 30. The bracket 20 and the handle assembly 30 are mounted on the tray body 10.

In one embodiment, the tray body 10 includes four connecting plates 11. The four connecting plates 11 include a first connecting plate 111, a second connecting plate 112, a third connecting plate 113, and a fourth connecting plate 114. The first connecting plate 111 and the third connecting plate 113 are oppositely arranged, and the second connecting plate 112 and the fourth connecting plate 114 are oppositely arranged. Two end portions of the first connecting plate 111 are provided with protrusions 1111 for resisting hardware to be installed. The second connecting plate 112 defines a snap groove 1121 and a fixing groove 1122. The handle assembly 30 and the second connecting plate 112 are fixed together through the fixing groove 1122. A first slot 1131 is defined penetrating the third connecting plate 113 for receiving a light guide rod 13, and one end of the light guide rod 13 is inserted into the second connecting plate 112. In one embodiment, the light guide rod 13 is made of polycarbonate.

The bracket 20 includes a bottom plate 21 and two side plates 22 respectively connected to two sides of the bottom plate 21, and the two side plates 22 are respectively connected to the first connecting plate 111 and the third connecting plate 113 of the tray body 10. In one embodiment, each of the two side plates 22 is provided with a buckle (not shown), which is buckled on the corresponding first connecting plate 111 and the third connecting plate 113. The bottom plate 21 and the two side plates 22 define a plurality of first through holes 23 for fixing the hardware to be installed on the bracket 20 by a fixing member (not shown). In one embodiment, the number of the first through holes 23 is four. Two of the four first through holes 23 are defined in the bottom plate 21, and the remaining two of the four first through holes 23 are defined in the two side plates 22. In one embodiment, the fixing member is a screw.

The handle assembly 30 includes a handle 31, a rotating shaft 32, a torsion spring 33, and a snap hook 34. The handle 31 is hinge mounted on the second connecting plate 112 through the rotating shaft 32 on one end of the second connecting plate 112, and the handle 31 can be accommodated in the second connecting plate 112 by rotation, so as to facilitate the installation and removal of the tray body 10. The handle 31 includes a first connecting portion 311 and a second connecting portion 312. The first connecting portion 311 and the second connecting portion 312 are located at one end of the handle 31. The first connecting portion 311 and the second connecting portion 312 are arranged symmetrically. The first connecting portion 311 defines a second through hole 3111, and the second connecting portion 312 defines a third through hole 3121. The second through hole 3111 and the third through hole 3121 receive the rotating shaft 32. In one embodiment, the first connecting portion 311 is substantially circular, and the second connecting portion 312 is substantially cam-shaped. The handle 31 further defines a second slot 313, and the snap hook 34 is received in the second slot 313. The torsion spring 33 is sleeved on the rotating shaft 32, such that one end of the torsion spring 33 passes through one end of the handle 31, and another end of the torsion spring 33 is accommodated on the second connecting plate 112 to restrict rotation of the handle 31. The snap hook 34 is located at one end of the handle 31. The snap hook 34 includes a latching portion 341 and a locking portion 342. The locking portion 342 protrudes from the latching portion 341 and engages with the fixing groove 1122. The latching portion 341 includes a latching body 3411 and a resilient member 3412. The resilient member 3412 is connected to one end of the latching body 3411, and when the resilient member 3412 receives an external force, the resilient member 3412 is moved adjacent to the latching body 3411 to be installed to the second slot 313. In use, the handle assembly 30 presses the resilient member 3412 to push the snap hook 34 into the second slot 313 at one end of the handle 31. When the handle 31 rotates, the locking portion 342 is engaged in the fixing groove 1122, so that the handle 31 and the second connecting plate 112 are tightly connected. In one embodiment, the snap hook 34 is made of plastic.

The tray device 100 further includes an insulating sheet 41 and a resilient sheet 51. The insulating sheet 41 is mounted on the bracket 20. The insulating sheet 41 directly contacts the hardware to be installed to achieve insulation and ensure safety.

The resilient sheet 51 is connected to a side of the second connecting plate 112. In one embodiment, the resilient sheet 51 is an electromagnetic interference (EMI) sheet. The resilient sheet 51 is in close contact with the hardware to be placed and the tray body 10 to effectively reduce radiation. The resilient sheet 51 defines a plurality of holes (not labeled). The resilient sheet 51 is further provided with a plurality of hooks 511 for snapping on an edge of the snap groove 1121 to achieve a fixed connection between the resilient sheet 51 and the second connecting plate 112. In one embodiment, the number of the hooks 511 is six, and two groups of three hooks 511 are arranged symmetrically.

In one embodiment, an electronic device housing includes a cabinet and the tray device 100, and the tray device 100 is connected to the cabinet for receiving a hard disk.

When a 2.5-inch hard disk is installed on the tray device 100, the 2.5-inch hard disk is fixed to the bracket 20 by screws. The screws can be loosened to disassemble the 2.5-inch hard disk.

When a 3.5-inch hard disk is installed on the tray device 100, the 3.5-inch hard disk is placed on the bracket 20 at a certain angle for installation. To disassemble the 3.5-inch hard disk, the protrusions 1111 are pressed.

When the tray device 100 is used in a server, the tray device 100 is fixed to a server case through the handle 31 engaging with a hole of the server case during installation, and it is only necessary to rotate the handle 31 for disassembly so that the second connecting portion 312 leaves a corresponding hole of the server case.

The above-mentioned tray device 100 has a low cost, tool-free assembly and disassembly, and high versatility for carrying various types of hard disks.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A tray device for accommodating a hard disk, the tray device comprising:
   a tray body comprising at least one connecting plate, a resilient sheet, and a handle assembly; and
   a bracket mounted on the tray body; wherein:
   the resilient sheet is coupled to the at least one connecting plate;
   the handle assembly comprises a handle, a rotating shaft, and a snap hook;
   one end of the handle is hinge-mounted to the at least one connecting plate through the rotating shaft;
   the snap hook comprises a latching portion and a locking portion, the latching portion comprises a latching body and a resilient member extending from an end of the latching body, the resilient member is inclined relative to the latching body, the handle defines a slot, the latching body and the resilient member is accommodated in the slot, the locking portion protrudes from the latching body; and
   the at least one connecting plate defines a fixing groove for engaging with the locking portion.

2. The tray device of claim 1, wherein:
   the at least one connecting plate comprises a first connecting plate and a second connecting plate;
   the first connecting plate is coupled to the second connecting plate;
   two ends of the first connecting plate comprise protrusions; and
   the second connecting plate defines the fixing groove.

3. The tray device of claim 2, wherein:
   the at least one connecting plate further comprises a third connecting plate defining a first slot for receiving a light guide rod; and
   one end of the light guide rod is inserted into the second connecting plate.

4. The tray device of claim 2, wherein:
   the resilient sheet comprises a plurality of hooks for snapping on the second connecting plate.

5. The tray device of claim 2, wherein:
   the handle assembly comprises a torsion spring sleeved on the rotating shaft;
   one end of the torsion spring passes through the handle, and another end of the torsion spring is accommodated on the second connecting plate.

6. The tray device of claim 1, wherein:
   the bracket comprises a bottom plate and at least one side plate coupled to the bottom plate; and
   the bottom plate and the at least one side plate define a plurality of first through holes.

7. The tray device of claim 1, wherein:
   the handle comprises a first connecting portion and a second connecting portion located at the one end of the handle;
   the first connecting portion defines through hole for holding one end of the rotating shaft;
   the second connecting portion defines another through hole for holding another end of the rotating shaft.

8. The tray device of claim 1, further comprising an insulating sheet, wherein:
   the insulating sheet is mounted on the bracket.

9. A tray device for accommodating a hard disk, the tray device comprising:
   a tray body comprising a first connecting plate, a second connecting plate, a third connecting plate, and a fourth connecting plate, the first connecting plate and the third connecting plate oppositely arranged, and the second connecting plate and the fourth connecting plate oppositely arranged;
   a resilient sheet;
   a handle assembly; and
   a bracket mounted on the tray body; wherein:
   the resilient sheet is coupled to the second connecting plate;
   the handle assembly comprises a handle, a rotating shaft, and a snap hook;

one end of the handle is hinge-mounted to the second connecting plate through the rotating shaft;

the snap hook comprises a latching portion and a locking portion, the latching portion comprises a latching body and a resilient member extending from an end of the latching body, the resilient member is inclined relative to the latching body, the handle defines a slot, the latching body and the resilient member is accommodated in the slot, the locking portion protrudes from the latching body; and the second connecting plate defines a fixing groove for engaging with the locking portion.

10. The tray device of claim 9, wherein:
two ends of the first connecting plate comprise protrusions.

11. The tray device of claim 10, wherein:
the third connecting plate defines a first slot for receiving a light guide rod; and
one end of the light guide rod is inserted into the second connecting plate.

12. The tray device of claim 11, wherein:
the resilient sheet comprises a plurality of hooks for snapping on the second connecting plate.

13. The tray device of claim 12, wherein:
the bracket comprises a bottom plate and at least one side plate coupled to the bottom plate; and
the bottom plate and the at least one side plate define a plurality of first through holes.

14. The tray device of claim 13, wherein:
the handle comprises a first connecting portion and a second connecting portion located at the one end of the handle;
the first connecting portion defines a second through hole;
the second connecting portion defines a third through hole; and
the second through hole and the third through hole receive the rotating shaft.

15. The tray device of claim 14, wherein:
the handle assembly comprises a torsion spring sleeved on the rotating shaft;
one end of the torsion spring passes through the handle, and another end of the torsion spring is accommodated on the second connecting plate.

16. The tray device of claim 15, further comprising an insulating sheet, wherein:
the insulating sheet is mounted on the bracket.

* * * * *